(12) United States Patent
Bulan et al.

(10) Patent No.: US 7,056,484 B2
(45) Date of Patent: Jun. 6, 2006

(54) METHOD FOR PRODUCING TRICHLOROSILANE

(75) Inventors: Andreas Bulan, Langenfeld (DE); Rainer Weber, Odenthal (DE)

(73) Assignee: Solarworld Aktiengesellschaft, Bonn (DE)

( * ) Notice: Subject to any disclaimer, the term of this patent is extended or adjusted under 35 U.S.C. 154(b) by 420 days.

(21) Appl. No.: 10/380,351

(22) PCT Filed: Sep. 7, 2001

(86) PCT No.: PCT/EP01/10359

§ 371 (c)(1),
(2), (4) Date: Jul. 22, 2003

(87) PCT Pub. No.: WO02/22501

PCT Pub. Date: Mar. 21, 2002

(65) Prior Publication Data

US 2004/0028593 A1 Feb. 12, 2004

(30) Foreign Application Priority Data

Sep. 14, 2000 (DE) .......................... 100 45 365
Oct. 2, 2000 (DE) .......................... 100 48 794

(51) Int. Cl.
*C01B 33/08* (2006.01)

(52) U.S. Cl. .................. 423/342; 423/347; 423/349
(58) Field of Classification Search .......... 423/341, 423/342, 347, 348, 349
See application file for complete search history.

(56) References Cited

U.S. PATENT DOCUMENTS

| 2,380,995 A | 8/1945 | Rochow |
| 4,520,130 A | 5/1985 | Hashiguchi et al. |
| 4,676,967 A * | 6/1987 | Breneman .................. 423/347 |
| 6,057,469 A | 5/2000 | Margaria et al. |

FOREIGN PATENT DOCUMENTS

| DE | 41 04 422 A1 | 8/1992 |
| EP | 0 893 408 | 1/1999 |
| EP | 1 020 472 B1 | 7/2000 |

OTHER PUBLICATIONS

K.M. Lewis and D.G. Rethwisch, 1993, Mathematical Modelling of Diffusion and Microkinetics in Direct Reactions of Silicon and in the Processing of Electronic Components, *Catalyzed Direct Reactions of Silicon*—Elsevier Science Publishers B.V.

K. M. Lewis and D.G. Rethwisch, 1993, By–Products From Waste Treatment for a Bench Scale Trichlorosilane/Tetrachlorosilane Direct Process, *Catalyzed Direct Reactions of Silicon*—Elsevier Science Publishers B.V.

Jeffrey Y.P. MUI Dietmar Seyferth, Mar. 31, 1979–Apr. 1, 1981, Low–Cost Solar Array Project Silicon Material Task, Final Report on Investigation of the Hydrogenation of $SiCl_4$—Massachusetts Institute of Technology.

Barbara Elvers, Stephen Hawkins, William Russey and Gail Schulz, 1993, Silicon Compounds, Inorganic; vol. A 24, Ullmann's Encyclopedia of Industrial Chemistry, Fifth Completely Revised Edition.

American Chemical Society, 1984, Industrial Inorganics, vol. 101, Chemical Abstracts.

America Chemical Society, 1988, Industrial Inorganics, vol. 109, Chemical Abstracts.

* cited by examiner

*Primary Examiner*—Edward M. Johnson
(74) *Attorney, Agent, or Firm*—McGlew and Tuttle, P.C.

(57) ABSTRACT

The invention relates to a method for producing trichlorosilane by reacting silicon with hydrogen, silicon tetrachloride and, optionally, hydrogen chloride, whereby the silicon is provided in comminuted form, and the silicon is mixed with a catalyst during comminution.

13 Claims, No Drawings

METHOD FOR PRODUCING TRICHLOROSILANE

The present invention relates to a method for producing trichlorosilane by reacting crushed silicon with silicon tetrachloride, hydrogen and, if necessary, hydrogen chloride.

Trichlorosilane $HSiCl_3$ is a valuable intermediate product for example for producing high-purity silicon, dichlorosilane $H_2SiCl_2$, silane $SiH_4$ and bonding agents.

High-purity silicon is used versatilely for electronic and photo-voltaic purposes, e.g. in the manufacture of solar cells. To produce high-purity silicon, metallurgical silicon is converted, for example, to gaseous silicon compounds, preferably trichlorosilane, these compounds being purified and subsequently reconverted to silicon.

Trichlorosilane is mainly produced by reacting silicon with hydrogen chloride, or silicon with silicon tetrachloride, hydrogen and, if necessary, hydrogen chloride (Ullmann's Encyclopedia of Industrial Chemistry, $5^{th}$ ed. (1993), Vol. A24, 4–6). As a rule, silicon is reacted with silicon tetrachloride and hydrogen in the presence of catalysts, and mainly copper catalysts.

As is known from DE 41 04 422 A1, silicon is reacted with silicon tetrachloride and hydrogen in a fluidized bed without using pressure in the presence of copper salts of a low, aliphatic, saturated dicarbon acid, particularly copper oxalate.

It is also known to react silicon with silicon tetrachloride, hydrogen and, if necessary, hydrogen chloride, in the presence of powder copper (Chemical Abstracts CA 101, no. 9576d, 1984) or mixtures of copper metal, metal halogenides and bromides or iodides of iron, aluminum or vanadium (Chemical Abstracts CA 109, no. 57621b, 1988).

Trichlorosilane is usually produced in a fluidized bed (Ullmann's Encyclopedia of Industrial Chemistry, $5^{th}$ ed. (1993), Vol. A24, 4–6). A disadvantage of methods according to the state of the art using copper catalysts and/or catalyst mixtures containing copper is that very often small catalyst particles are carried out of the fluidized bed. As a result, the yield of the desired trichlorosilane decreases in the course of the process and new catalyst needs to be introduced into the reactor. These catalyst losses due to catalyst being carried away cause additional costs, particularly when copper catalyst is used, since copper catalyst is comparatively expensive.

Therefore the task was to provide a method for producing trichlorosilane that is characterized by a high reaction velocity and a high space-time yield respectively, and without large catalyst quantities being carried out undesiredly.

Surprisingly it was found that only minor losses occur due to catalyst being carried out when crushed silicon is used and the desired catalyst is added during milling of the silicon, particularly of metallurgical silicon. When reacting such crushed silicon with hydrogen, silicon tetrachloride and, if necessary, hydrogen chloride to form trichlorosilane, the yield in trichlorosilane remained almost the same, even during longer reaction periods.

Subject-matter of the invention is therefore a method for producing trichlorosilane by reacting silicon with hydrogen, silicon tetrachloride and, if necessary, hydrogen chloride, characterized in that the silicon is provided in crushed form and is mixed with catalyst during crushing.

The silicon to be employed according to the invention can be produced, for example, by milling silicon, preferably metallurgical silicon, in a mill together with the desired catalyst, the silicon and the catalyst being fed into the mill together or successively.

It is also possible, however, to mill the silicon in a mill made of a material selected such that due to attrition during milling the desired catalyst concentration is standardized in the silicon.

It is also possible, however, to mill a mixture of silicon and catalyst in a mill made of a material that was chosen such that due to attrition during the milling process further catalytically active material is introduced into the silicon.

Further, the mixture of silicon and catalyst can be milled in any other known crushing apparatuses, e.g. a jaw crusher.

Preferably the crushing is carried out in an inert atmosphere.

Working in an inert atmosphere prevents formation of an oxidic layer on the individual silicon particles. Such layer prevents direct contact between catalyst and silicon which would result in a poorer catalysing of the reaction with silicon tetrachloride, hydrogen and, if necessary, hydrogen chloride to trichlorosilane.

An inert atmosphere can be achieved, for example, by adding an inert gas during milling. Suitable inert gasses are, for example, nitrogen and/or argon.

Suitable materials for the crushing apparatus in use, particularly in case of a mill or jaw crusher, are for example copper, iron and alloys of these metals with each other or with other metals, e.g. brass or bronze. Crushing apparatuses made of other materials are also suitable, e.g. mills with a ceramic coating such as tungsten carbide.

A suitable mill, for example, can be a roller mill or a ball mill, other types of mills can also be used.

The milling is carried out so that, for example, the resulting milled silicon has an average grain diameter of 10 to 1000 μm, preferably of 100 to 600 μm.

Suitable catalysts are, for example, copper catalysts and/or iron catalysts.

Suitable copper catalysts are, for example, copper, preferably in the form of copper powder with a grain size below 100 μm, or compounds of copper, preferably copper oxide containing copper with the oxidation number of 1 or copper chloride, e.g. cuprous chloride.

Suitable iron catalysts are, for example, iron, preferably in the form of iron powder with a grain size below 100 μm, or compounds of iron, preferably iron chloride, particularly preferred ferrous chloride.

It is also possible to use mixtures of copper catalysts and/or iron catalysts with further catalytically active components. Such catalytically active components are, for example, metal halogenides, such as e.g. chlorides, bromides or iodides of aluminum, vanadium or antimony.

The silicon to be employed according to the invention which is provided in milled form and is mixed with a catalyst during milling can be pre-reacted, e.g. with hydrogen chloride, or hydrogen chloride and hydrogen, before being reacted according to the invention with hydrogen, silicon tetrachloride and, if necessary, hydrogen chloride.

Usually, the silicon used in the method according to the invention has a concentration between 0.5 to 10 weight percent, preferably between 1 to 5 weight percent catalyst calculated as metal, said weight percent being based on the total weight of milled silicon and catalyst. It is also possible, however, to use crushed silicon with a higher catalyst concentration.

The method according to the invention can be carried out, for example, at a pressure of 1 to 40 bar (absolute), preferably of 20 to 35 bar.

The process is carried out, for example, at temperatures from 400 to 800° C., preferably from 450 to 600° C.

The selection of the reactor for the reaction according to the invention is not critical, provided that under the reaction conditions the reactor shows adequate stability and permits the contact of the starting materials. The process can be carried out, for example, in a fixed bed reactor, a rotary tubular kiln or a fluidized-bed reactor. It is preferred to carry out the reaction in a fluidized-bed reactor.

The mol ratio of hydrogen to silicon tetrachloride in the reaction according to the invention can be for example 0.25:1 to 4:1. A mol ratio of 0.6:1 to 2:1 is preferred.

During the reaction according to the invention hydrogen chloride can be added, and the amounts of hydrogen chloride can be varied over a wide range. Preferably an amount of hydrogen chloride is added such that a mol ratio of silicon tetrachloride to hydrogen chloride of 1:0 to 1:10, particularly preferred of 1:0.5 to 1:1, is obtained.

Preferably the method according to the invention is carried out in the presence of hydrogen chloride.

The trichlorosilane produced according to the method according to the invention can be used, for example, for the manufacture of silane and/or hyper-pure silicon.

Therefore the invention also relates to a method for producing silane and/or hyper-pure silicon on the basis of trichlorosilane obtained according to the method specified above.

Preferably the method according to the invention is integrated into a general method for producing silane and/or hyper-pure silicon.

Particularly preferred, the method according to the invention is integrated into a multistage general method for producing hyper-pure silicon, as specified for example in "Economics of Polysilicon Process, Osaka Titanium Co., DOE/JPL 1012122 (1985), 57–78" and comprising the following steps:
a) Production of trichlorosilane;
b) Disproportionation of trichlorosilane to yield silane;
c) Purifying silane to obtain high-purity silane; and
d) Thermal decomposition of silane in a fluidized-bed reactor and depositing of hyper-pure silicon on the silicon particles which form the fluidized bed.

It is even more particularly preferred that the method according to the invention be integrated into a method for producing silane and/or hyper-pure silicon comprising the following steps:
1. Trichlorosilane synthesis according to the method according to the invention and subsequent isolation of the produced trichlorosilane by distillation and recycling of the unreacted silicon tetrachloride, and, if desired, the unreacted hydrogen;
2. Disproportionation of trichlorosilane to silane and silicon tetrachloride through the intermediate stages of dichlorosilane and monochlorosilane on alkaline catalysts, preferably catalysts containing amino groups, carried out in two apparatuses or in one, and recycling of the produced silicon provided as a high-boiling component into the first reaction area;
3. Further use of the silane of the purity given after the previous step, or purifying the silane until the purity required for the intended purpose is achieved, preferably by distillation, particularly preferred by distillation under pressure:
and, if necessary,
4. Thermal decomposition of silane to obtain high-purity silicon, usually above 500° C.
Apart from thermal decomposition on electrically heated high-purity silicon rods, another suitable method is the thermal decomposition in a fluidized bed consisting of hyper-pure silicon particles, particularly when the production of solar-grade high-purity silicon is desired. To this aim, silane can be mixed with hydrogen and/or inert gases at a mol ratio of 1:0 to 1:10.

The method according to the invention is being explained in more detail in the following examples, without restricting the inventive idea insofar.

EXAMPLES

Example 1 (Comparative example)

In a reactor consisting of a glass tube with a diameter of 3 cm and a height of 18 cm and an in-built glass frit, silicon of the grain size fraction of 40–400 µm was employed after having been milled in a jaw crusher the jaws of which were provided with a tungsten carbide coating. The milling process took approx. 5 minutes per kilogram of silicon used. The milled silicon was mixed with cuprous chloride. The mixture of silicon and cuprous chloride had a concentration of 3 weight percent copper. 40 g of this mixture were heated to 500° C. and agitated by a helical ribbon impeller. A gas mixture of hydrogen and silicon tetrachloride with a mol ratio of 1.85:1 was now led through the charge from below. The gas velocity was 2.85 cm/s, with a residence time of the gas mixture in the silicon charge of 1.7 s. The reaction occurred at a pressure of 1 bar (absolute). After 30 min the yield of trichlorosilane amounted to approx. 5%, based on the amount of silicon tetrachloride employed; it decreased to 0.4% after another 30 min and then remained constant.

Example 2

In a reactor consisting of a glass tube with a diameter of 3 cm and a height of 18 cm and an in-built glass frit, silicon of the grain size fraction of 40–400 µm was employed after having been milled together with cuprous chloride in a jaw crusher the jaws of which were provided with a tungsten carbide coating. The milling process took approx. 5 minutes per kilogram of silicon used. Subsequently the mixture contained 3 weight percent copper. 40 g of this mixture were heated to 500° C. and agitated by a helical ribbon impeller. A gas mixture of hydrogen and silicon tetrachloride with a mol ratio of 1.85:1 was now led through this charge from below. The gas velocity was 2.85 cm/s, with a residence time of the gas mixture in the silicon charge of 1.7 s. The reaction occurred at a pressure of 1 bar (absolute). After 30 min the yield of trichlorosilane amounted to approx. 8%, based on the amount of silicon tetrachloride employed; it increased to 12.1% after another 30 min and then remained constant.

What is claimed is:

1. A method for producing trichlorosilane by reacting silicon with hydrogen and silicon tetrachloride, wherein the silicon is provided as milled silicon and is mixed with a catalyst during milling.

2. A method according to claim 1, wherein the silicon and the desired catalyst are milled together in a mill.

3. A method according to claim 1, wherein the silicon is milled in a mill made of a material from which due to attrition during milling the desired catalyst concentration is standardized in the silicon.

4. A method according to claim 1, wherein the particles of the milled silicon have an average diameter of 10 to 1000 µm.

5. A method according to claim 1, wherein the concentration of catalyst, calculated as metal, that is contained in the milled silicon, is between 0.5 to 10 weight percent based on the total weight of milled silicon and catalyst.

6. A method according to claim 1, wherein the concentration of catalyst, calculated as metal, that is contained in the milled silicon is between 1 to 5 weight percent based on the total weight of milled silicon and catalyst.

7. A method according to claim 1, wherein the reaction is carried out at a pressure of 1 to 40 bar (absolute).

8. A method according to claim 1, wherein the reaction is carried out at temperatures from 400 to 800° C.

9. A method according to claim 1, wherein the mol ratio of hydrogen to silicon tetrachloride is 0.25:1 to 4:1.

10. A method according to claim 1, wherein the mol ratio of hydrogen to silicon tetrachloride is 1:0 to 1:10.

11. A method according to claim 1 for producing trichlorosilane by reacting silicon with hydrogen, silicon tetrachloride and hydrogen chloride, wherein the silicon is provided as milled silicon and is mixed with a catalyst during milling.

12. A method for producing at least one of silane and hyper-pure silicon, wherein the starting material is trichlorosilane which is obtained by reacting silicon with hydrogen and silicon tetrachloride, the silicon being provided as milled silicon and being mixed with a catalyst during milling.

13. A method according to claim 12 for producing at least one of silane and hyper-pure silicon, wherein the starting material is trichlorosilane which is obtained by reacting silicon with hydrogen, silicon tetrachloride and hydrogen chloride, the silicon being provided as milled silicon and being mixed with a catalyst during milling.

\* \* \* \* \*